US012131290B2

(12) United States Patent
Clarke et al.

(10) Patent No.: US 12,131,290 B2
(45) Date of Patent: Oct. 29, 2024

(54) SPARE PART MANAGEMENT AND RESERVATION SYSTEM

(71) Applicant: Hewlett Packard Enterprise Development LP, Houston, TX (US)

(72) Inventors: Graham Clarke, Bishopton (GB); Gina M. Correa, Lincoln, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 241 days.

(21) Appl. No.: 17/809,553

(22) Filed: Jun. 28, 2022

(65) Prior Publication Data
US 2023/0419248 A1  Dec. 28, 2023

(51) Int. Cl.
*G06Q 10/00* (2023.01)
*G06Q 10/0833* (2023.01)
*G06Q 10/0837* (2023.01)
*G06Q 10/087* (2023.01)

(52) U.S. Cl.
CPC ....... *G06Q 10/087* (2013.01); *G06Q 10/0833* (2013.01); *G06Q 10/0837* (2013.01)

(58) Field of Classification Search
CPC .................................................. B65G 1/1378
USPC .......................................................... 705/28
See application file for complete search history.

(56) References Cited

U.S. PATENT DOCUMENTS

| 2007/0124216 A1* | 5/2007 | Lucas | G06Q 30/02 |
| | | | 705/26.1 |
| 2018/0267518 A1* | 9/2018 | Hassman | G05B 19/41845 |
| 2023/0222454 A1* | 7/2023 | Cella | G06N 7/01 |
| | | | 705/28 |

FOREIGN PATENT DOCUMENTS

| CN | 106920061 A | * | 7/2017 | |
| CN | 108960741 A | * | 12/2018 | ............. G06Q 10/04 |
| CN | 113919790 A | * | 1/2022 | |
| JP | 2002342506 A | * | 11/2002 | |
| WO | WO-2022256564 A1 | * | 12/2022 | ........... B65G 1/1378 |

* cited by examiner

*Primary Examiner* — Russell S Glass
(74) *Attorney, Agent, or Firm* — Dickinson Wright

(57) ABSTRACT

Techniques are provided for a spare part management and reservation system. Based on a received request from a first client device, stored data is retrieved indicating whether a part is available to a user. A first indication is received from the first client device comprising a request from the user to reserve the part in an inventory. In response to data indicating that the part is available to the user, a contingent reservation of the part by the user is generated and transmitted. A second indication comprising a notification indicating whether the part has been consumed by the user is received from the first client device. In response to the notification indicating that the part has or has not been consumed by the user, a real-time update to the contingent reservation comprising either a confirmed reservation or an indication that the part is available for reservation is generated and transmitted.

19 Claims, 13 Drawing Sheets

SPARE PART MANAGEMENT AND RESERVATION SYSTEM

BACKGROUND

Field service inventory management generally includes tracking and managing the storage, request, transfer, and consumption of inventory items, e.g., field-service spare parts. For example, parts inventory can be tracked and managed using a combination of automated and manual processes for recording part usage, consumption, and returns; forecasting new part shipments; and facilitating part replenishments.

Modern field service inventory management systems may include Spares Management Service (SMS) operations that automate previously manual processes, such as counting and recording each inventory item to fulfill field technician part requests. These systems may also enable inventory stock optimization, product identification and tracking, part reordering/replenishment, and returns of defective or unused parts. For example, SMS operations may provide users with real-time data on inventory stock conditions (part availability) and enable inventory forecasting by leveraging various inventory tracking technologies, such as part identifiers (e.g., stock-keeping units (SKUs), quick response (QR) codes, serial numbers, or product numbers), smart storage lockers, and forward (e.g., strategically distributed) inventory locations.

Inventory management systems including SMS operations are typically part of a larger enterprise resource planning (ERP) system. ERP systems comprise business management software that may allow for integrating inventory stock, accounting, point-of-sale, supply chain management and other functions.

BRIEF DESCRIPTION OF THE DRAWINGS

Various objects, features, aspects and advantages of the inventive subject matter will become more apparent from the following specification, along with the accompanying drawings in which like numerals represent like components.

Figure 1:
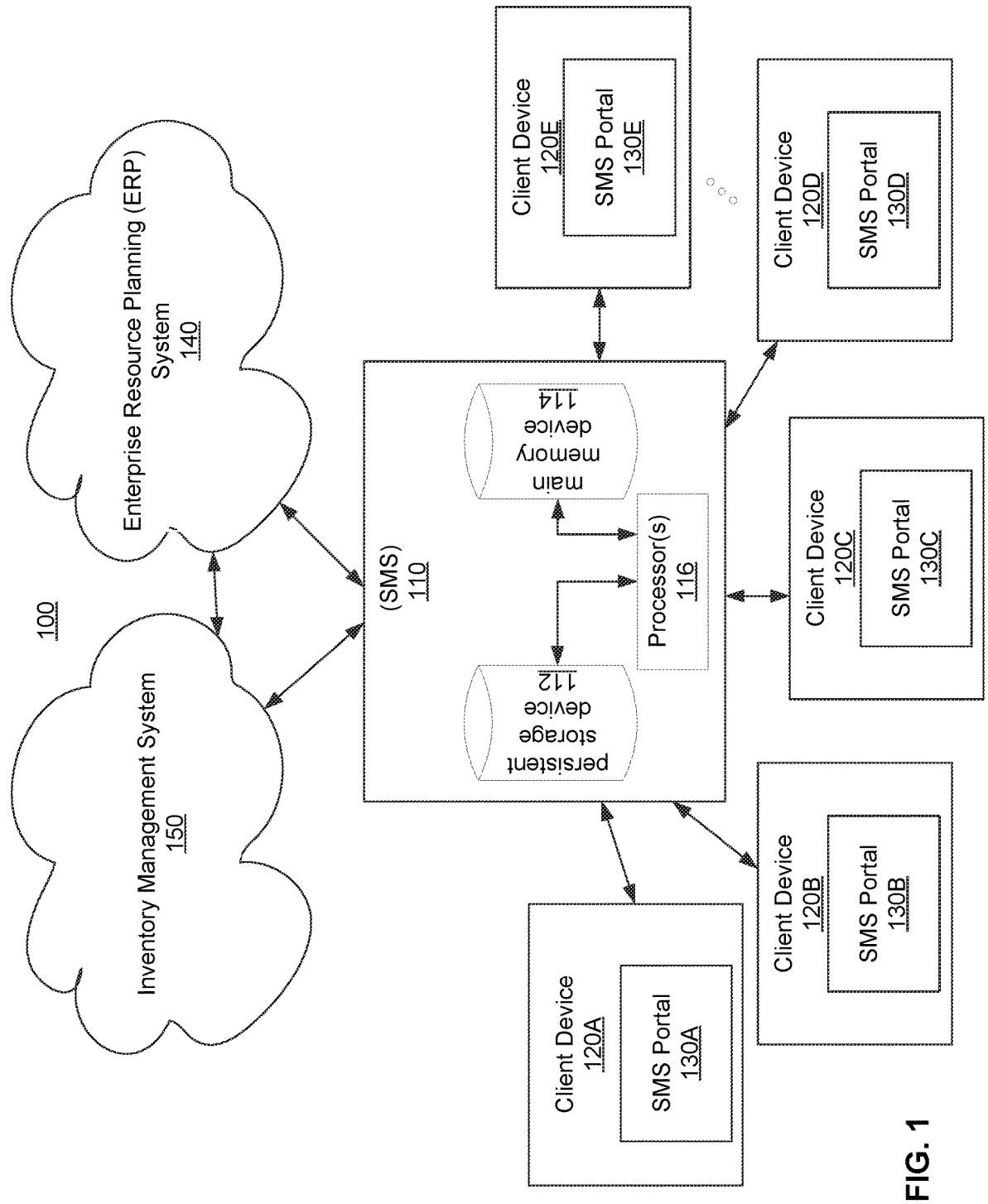
FIG. 1 illustrates an overview diagram of an SMS portal-based parts reservation system in accordance with an example.

While the examples are described with reference to the above drawings, the drawings are intended to be illustrative, and other embodiments are consistent with the spirit, and within the scope, of the various examples.

DETAILED DESCRIPTION

Field service inventory management systems generally include tracking, managing, and organizing stock levels, orders, sales, and deliveries of parts. For example, such systems may be used to maintain optimal part stock levels, track parts during shipping/transport to inventory locations, count and record parts, and note out-of-stock instances for individual parts.

As mentioned above, computerized SMS operations may automate previously manual inventory management processes, such as counting and recording each inventory item, to fulfill field technician part requests. SMS operations may also enable inventory stock optimization, product identification and tracking, reordering capabilities, and returns of unused parts. For example, SMS operations may provide users with real-time data on inventory stock conditions (part availability) and enable inventory forecasting and smart allocation capabilities by leveraging various inventory tracking technologies such as part identifiers (e.g., stock-keeping units (SKUs), quick response (QR) codes, serial numbers or product numbers), smart storage lockers, and forward (e.g., strategically and/or geographically distributed) inventory locations.

Inventory management systems including SMS hardware/software components are usually integrated with (and/or coupled to) a larger enterprise resource planning (ERP) system. ERP systems comprise business management hardware/software components that may allow for integrating inventory stock, accounting, point-of-sale, supply chain management and other functions.

SMS portal-based parts reservation systems may further enable client device users, such as field technicians or engineers, to perform one or more functions via an SMS portal, including, e.g., selecting an inventory location, viewing a real-time listing of parts corresponding to an inventory location, requesting a part, confirming and/or cancelling a part reservation, and viewing part inventory stock conditions.

While modern SMS portal-based parts reservation systems can deliver on many inventory management goals, these systems can often take an extended time (in some cases up to 17 minutes) to process user/customer parts reservation requests. This delay can be attributed to the latency of various back of system operations in the critical path of the parts reservation process (e.g., the latency of handshakes/reconciliation between SMS portal-based parts reservation systems, inventory order management systems, ERP systems, and accounting platforms; file transfer protocol (FTP) translations; warranty clearance checks, or any other intermediary processing delay). For example, current systems may employ batch jobs for parts reservation requests, e.g., every 2-3 minutes, rather than direct links for individual part reservation requests, and may require handshakes to be completed between the various order management systems before a request can be processed. Also, current SMS portal-based parts reservation systems generally do not allow for a contingent part reservation request that reconciles in real-time if the customer does not use the reserved part in a repair job. Rather, a part may have to be manually re-entered into the reservation system, e.g., as a returned item, if it is not used in a repair.

The focus of the disclosed inventive subject matter is to enable an improved Spares Management Service (SMS) portal-based parts reservation system. The SMS portal-based parts reservation system disclosed herein coordinates inventory order management, Enterprise Resource Planning (ERP), and parts management platforms to allow for (1) a contingent part reservation request that reconciles in real-time if the customer does not use the reserved part in a repair job, and (2) part replenishment if the customer consumes the part. Such a system may include a combination of client/server software applications, supply chain logistics expertise, smart lockers, and physical inventory locations to deliver parts in time to fulfill service requests made by users (e.g., field technicians or engineers) as the need for field-service spare parts arises. Further, the disclosure includes improvements that move backend system operations out of the critical path for parts reservation requests and allow for real-time visibility of inventory at physical inventory sites associated with a customer (improved accuracy), on-site reservation cancellation (scan backs), and status updates on incoming part replenishments/open deliveries (real-time inventory status). For example, the system may provide real-time information regarding parts reservations, current and future part availability, and tracking data for parts en route to an inventory location.

One should appreciate that the disclosed techniques provide many advantageous technical effects including improving the efficiency and speed of field SMS portal-based parts reservation operations. It should also be appreciated that the following specification is not intended as an extensive overview, and as such, concepts may be simplified in the interests of clarity and brevity.

FIG. 1 illustrates an overview diagram of an SMS portal-based parts reservation system in accordance with an example. SMS portal-based parts reservation system 100 comprises Spares Management Service (SMS) 110; a plurality of client devices, e.g., client devices 120A-E, having SMS part reservation portal applications configured thereon, e.g., SMS part reservation portals 130A-E, respectively, enterprise resource planning (ERP) system 140, and inventory management system 150.

SMS 110 comprises an inventory order management platform configured to allow a user to reserve a part in an inventory. As used herein, a part may comprise an item or service that is recorded into an inventory. For example, an inventory may comprise a plurality of parts and/or types of parts staged at a plurality of physical locations to fulfill field service requests made by various users, e.g., field technicians or engineers. The items or services recorded into an inventory via inventory management system 150 may be generally available to users or accessible to certain users based on one or more criteria, e.g., a user's affiliation with an authorized merchant entity or inventory location, a clearance level, a valid warranty, or other information.

As shown, SMS 110 comprises at least one non-transitory memory, e.g., persistent storage device 112 and main memory device 114, having computer-readable instructions stored thereon for implementing an SMS portal-based parts reservation system which, when executed by at least one processor, e.g., processor(s) 116, coupled to the at least one memory, cause the at least one processor to perform at least one operation, as described in further detail below. One skilled in the art will note that SMS 110 may further comprise other systems, subsystems, and/or components (e.g., a display, a keyboard, a mouse, speakers, buttons, batteries, fans, motherboards, power supplies, etc.) for implementing the various part reservation operations described herein.

SMS 110 is electronically coupled to a plurality of client devices, e.g., client devices 120A-E, referred to herein individually as client device 120. A client device 120 comprises at least one computing device, e.g., a cellular smartphone, kiosk, personal data assistant, tablet, laptop computer, desktop computer, robot, vehicle, web camera, or other type of computing device. For example, a client device 120 may be a mobile device assigned to a user (e.g., a field technician) configured to transmit data to, and receive data communications from, SMS 110, ERP system 140, and/or inventory management system 150 via a public or private cellular telecommunication network.

As shown, each client device 120 comprises an SMS portal 130, e.g., client devices 120A-E comprise SMS portals 130A-E, respectively. As described in detail below, SMS portal 130 is configured to allow for technological improvements over a conventional SMS parts reservation system, including: (1) a contingent part reservation request that reconciles in real-time, e.g., if the user does not use the reserved part in a repair job, and (2) on-site reservation cancellation (scan backs), e.g., if a part is not used in a repair job. Therefore, SMS portal 130 allows for a part reservation to be cancelled without manually re-entering the part into inventory management system 150 or performing other high-latency back-end operations that are typically in the critical path for parts reservation requests, e.g., the back-end operations typically required for return items. Further, in various examples SMS portal 130 may also allow for real-time visibility of inventory at physical inventory sites associated with a customer (improved accuracy), and status updates on incoming part replenishments/open deliveries (real-time inventory status).

ERP system 140 comprises business management hardware/software components that may allow for integrating inventory stock, accounting, point-of-sale, supply chain management and other functions. In some examples, inventory management system 150 and/or SMS 110 may be an integrated subsystem of ERP system 140, or may comprise independent (e.g., proprietary) systems in communication with ERP system 140, as shown in FIG. 1. In operation, ERP 140 may be configured to reconcile a transaction related to a part reserved from an inventory via SMS 110 and inventory management system 150, facilitate replenishment of a reserved part, or perform various other back-end tasks related to inventory management generally, or parts reservation specifically. As mentioned above, the various examples herein relate to improving various parts reservation operations, including by moving certain high-latency back-end operations typically performed by ERP system 140 out of the critical path for implementing parts reservation requests.

Inventory management system 150 comprises inventory management hardware/software components, e.g., a parts inventory database, that allow for parts to be recorded into an inventory, checked out of an inventory, returned to an inventory, and/or other functions. Inventory management system 150 may be configured to manage a parts inventory across a plurality of physical inventory locations. For example, inventory management system 150 may comprise stored data indicating that a part is available to a user at an inventory location associated with the user.

While the SMS portal-based parts reservation system illustrated in FIG. 1 is exemplary for implementing the examples herein, one skilled in the art will appreciate that various other system architectures (e.g., wherein SMS 110 and/or inventory management system 150 is an integrated subsystem of ERP system 140) may be utilized. As such, SMS portal-based parts reservation system 100 should not be construed as being strictly limited to the examples described herein.

It should also be noted that the elements in FIG. 1, and the various functions attributed to each of the elements, while exemplary, are described as such solely for the purposes of ease of understanding. One skilled in the art will appreciate that one or more of the functions ascribed to the various elements may be performed by any one of the other elements, and/or by an element (not shown) configured to perform a combination of the various functions. Therefore, it should be noted that any language directed to an SMS 110, a client device 120, an SMS part reservation portal 130, an ERP system 140, an inventory management system 150, at least one processor 116, a persistent storage device 112, or a main memory device 114 should be read to include any suitable combination of computing devices, including servers, interfaces, systems, databases, agents, peers, controllers, or other types of computing devices operating individually or collectively to perform the functions ascribed to the various elements. Further, one skilled in the art will appreciate that one or more of the functions of the system of FIG. 1 described herein may be performed within the context of a client-server relationship, such as by one or more servers, one or more client devices (e.g., one or more user devices) and/or by a combination of one or more servers and client devices.

Figure 2A:
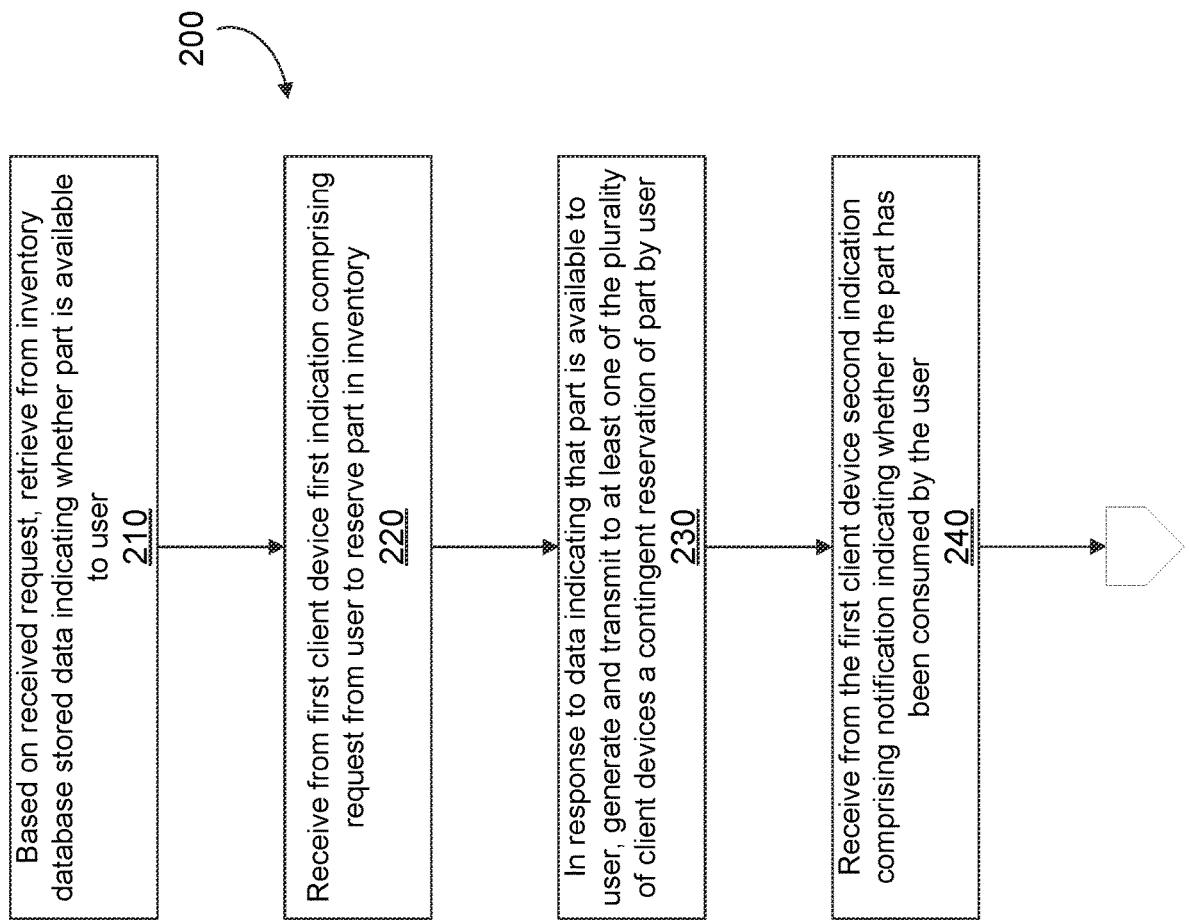
FIG. 2A illustrates a flow diagram of SMS portal-based parts reservation operations in accordance with an example.

FIG. 2A illustrates a flow diagram of SMS portal-based parts reservation operations in accordance with an example. As described above, SMS 110 may comprise at least one non-transitory memory, e.g., persistent storage device 112 and main memory device 114, having computer-readable instructions stored thereon, e.g., for implementing the operations of flow diagram 200 which, when executed by at least one processor, e.g., processor(s) 116, coupled to the at least one memory, cause the at least one processor to perform the operations in flow diagram 200.

For example, based on a received request from a first client device, e.g., client device 120A, SMS 110 may retrieve from an inventory database (e.g., inventory management system 150) stored data indicating whether a part is available to a user at step 210, where the first client device is one of a plurality of client devices having access to reserve parts in an inventory. For example, the stored data indicating that the part is available to the user may comprise data indicating that the part is available at an at least one inventory location associated with the user. For example, an inventory location may be associated with the user based on at least one of a merchant entity associated with the user, or a geographical location of the user. Further, the stored data indicating that the part is available to the user may also comprise warranty information associated with the part, e.g., data indicating that a part in need of replacement is still under warranty. If the part is not available at an inventory location local to the user, SMS 110 may generate and transmit to the user (via the first client device) an offer to initiate a confirmation order from a remote warehouse location. For example, the user may initiate a new claim by checking a part serial number against a field asset and selecting an SKU (part number) for the part the user wishes to replace. SMS 110 may then generate and transmit to the user (via the first client device) an update showing if the part is immediately available (a reservation) or if the part is being ordered from a remote warehouse location (an order confirmation).

At step 220, SMS 110 may receive from the first client device, e.g., client device 120A, a first indication comprising a request from the user to reserve the part in inventory. In some examples, the first indication may comprise at least one of the following: a Short Message Service message, a stock-keeping unit (SKU), a quick response (QR) code, a serial number, or a product number associated with the part. For example, the user may initiate a reserve request for a part in the inventory by using a client device to scan and transmit a QR code affixed to the part (or affixed to packaging related to the part). The scanned QR code and identification data associated with the user and/or client device may then be received by SMS 110 as a first indication comprising a request from the user to reserve the part in inventory. In some examples, the first indication may comprise a user selection of at least one inventory location associated with the user and/or the part.

At step 230, in response to data indicating that part is available to user, SMS 110 may generate and transmit to at least one of the plurality of client devices, e.g., at least one of client devices 120A-E, a contingent reservation of the part by user. A contingent reservation as used herein is a reservation contingent upon the part later being consumed by the user. For example, the user may be engaged to perform a repair job in which a defective part is identified as possibly needing replacement. Based on this initial assessment, the user may reserve the part on a contingent basis via the SMS portal of a client device associated with the user so the part will be accessible should it be needed to complete the repair job.

At step 240, SMS 110 may receive from the first client device a second indication comprising a notification indicating whether the part has been consumed (used in a repair case to the extent that it is no longer available in inventory) by the user. For example, when the user begins the repair job, the actual condition of the suspected defective part will become known, and at that point the user will assess whether the reserved part is really needed to complete the repair. Upon making the assessment, the user who reserved the part on a contingent basis via the SMS portal of an associated client device, may further transmit the notification indicating whether the part has been consumed via the SMS portal of the client device associated with the user. In some examples, the second indication may comprise at least one of the following: a Short Message Service message, a stock-keeping unit (SKU), a quick response (QR) code, a serial number, or a product number associated with the part. For example, the user may use a client device to scan a QR code affixed to the part (or affixed to packaging related to the part) and transmit a second indication comprising the QR code and a notification indicating whether the part has been consumed. SMS 110 may then receive and process the second indication based on the notification.

Figure 2B:
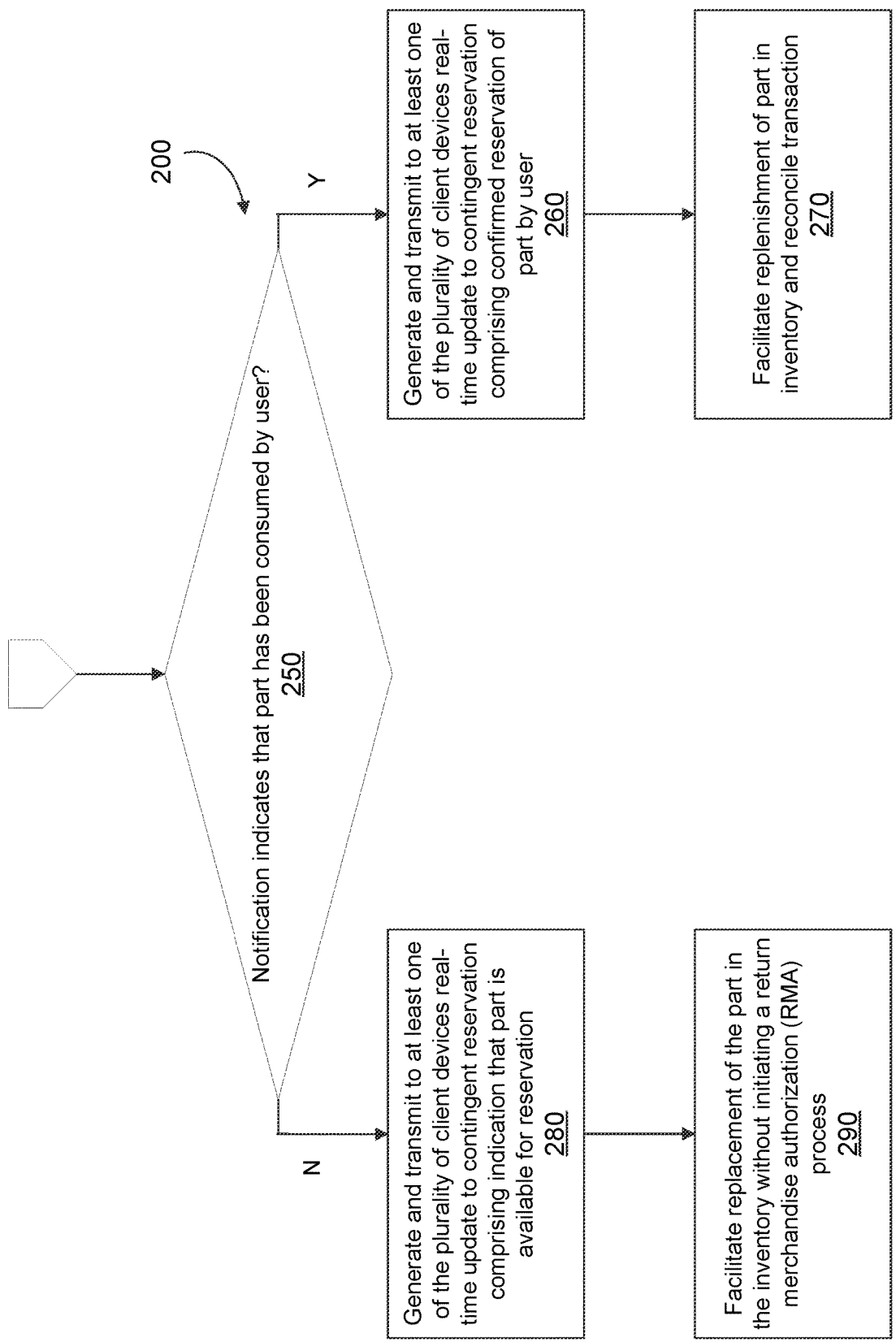
FIG. 2B illustrates a flow diagram of SMS portal-based parts reservation operations in accordance with an example.

FIG. 2B illustrates a flow diagram of SMS portal-based parts reservation operations in accordance with an example.

Continuing with flow diagram 200, SMS 110 may receive the notification indicating whether the part has been consumed by the user at step 250.

If the notification at step 250 indicates that the part has been consumed by the user, SMS 110 may generate and transmit to at least one of the plurality of client devices a real-time update to the contingent reservation comprising a confirmed reservation of part by user at step 260. For example, the SMS portal may be configured to receive a user interface selection that allows the user to update the status of the contingent reservation and transmit the status update via SMS 110 to at least one other client device, e.g., one or more of client devices 120A-E, to inform different users associated with those devices that the part has been consumed and is no longer available for reservation.

At step 270, SMS 110 may further facilitate replenishment of the part in the inventory and reconcile a transaction related to the part, e.g., via ERP system 140. For example, SMS 110 may facilitate replenishment of the part at an inventory location associated with the user. SMS 110 may further transmit a communication to ERP system 140 to reconcile an accounting process related to the part, such as by creating an invoice to bill an appropriate merchant entity for usage of the part.

If the notification at step 250 indicates that the part has not been consumed by the user, SMS 110 may generate and transmit to at least one of the plurality of client devices a real-time update to the contingent reservation comprising an indication that the part is available for reservation at step 280. In some examples, in response to the notification indicating that the part has not been consumed by the user, SMS 110 may facilitate replacement of the part in the inventory without initiating a return merchandise authorization (RMA) process at step 290. For example, the SMS portal may be configured to receive a user interface selection that allows the user to update the status of the contingent reservation and transmit the status update via SMS 110 to at least one other client device associated with a different user. Further, the user who reserved the part may facilitate replacement of the part in the inventory by scanning the part back into the inventory. For example, a user may return a good (non-defective) unused part via a portal or application configured on a client device to provide access to inventory management system 150. The inventory management system portal may allow the user to scan the unused part, e.g., a QR tracking number affixed to the unused part, and the scan may cause inventory management system 150 to update SMS portal 130 with the returned status of the part, automatically closing the open reservation.

Figure 3A:
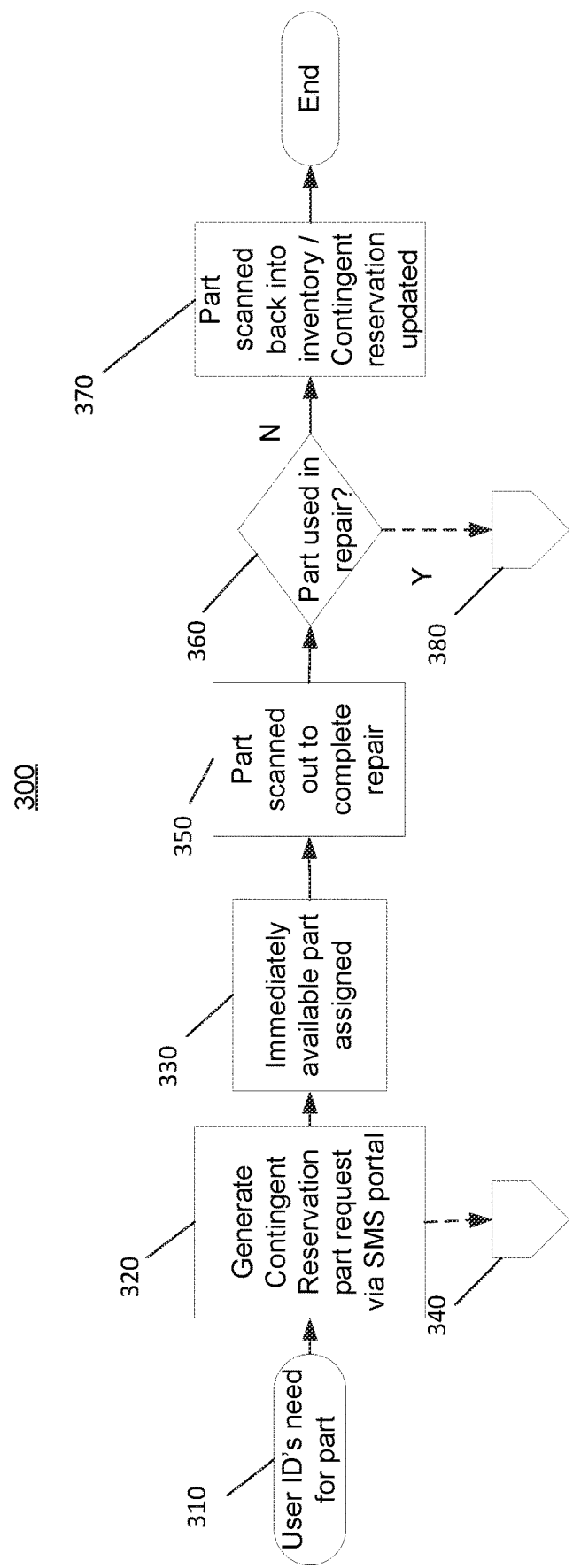
FIG. 3A illustrates a flow diagram of client-perspective SMS portal operations in accordance with an example.
Figure 3B:
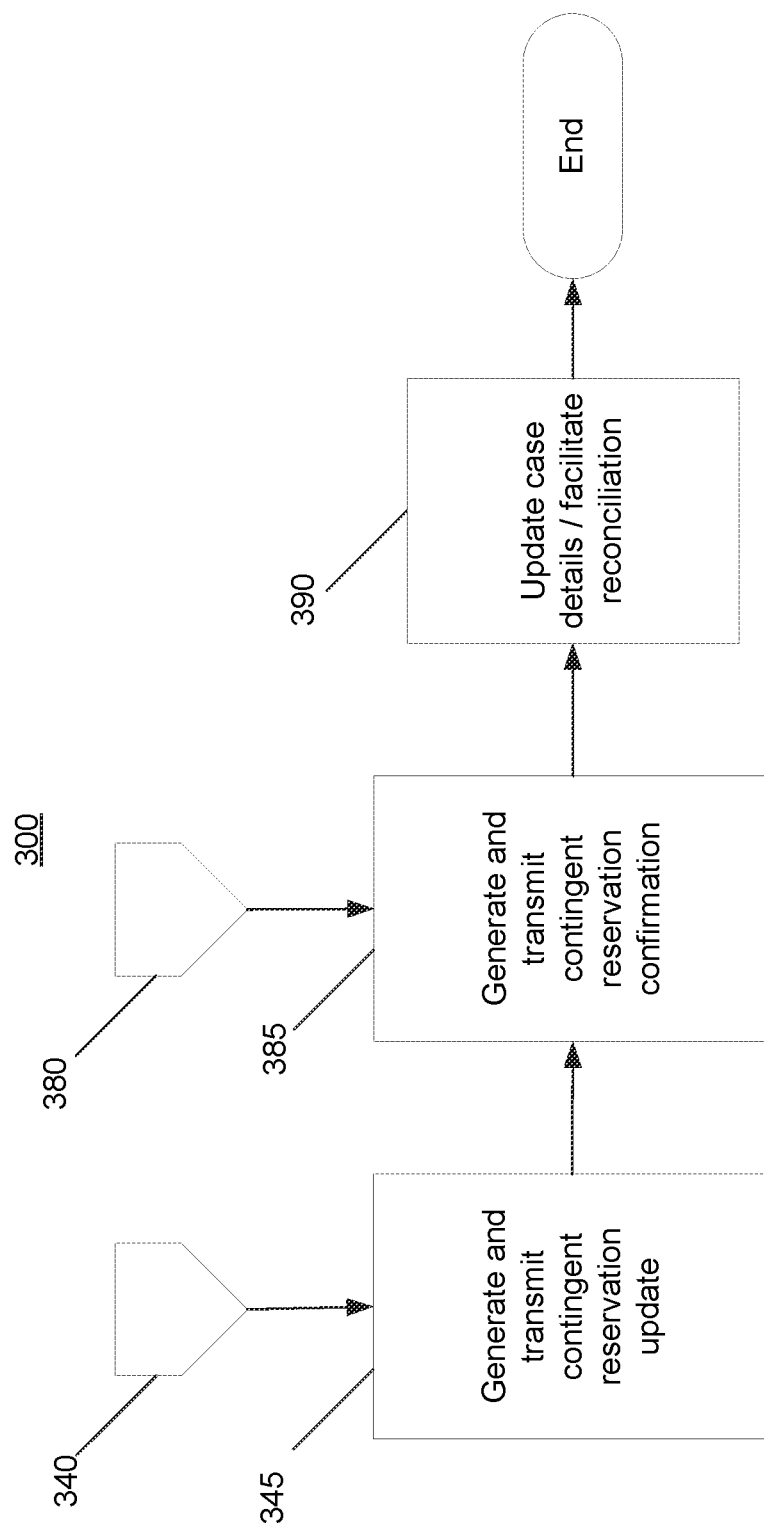
FIG. 3B illustrates a flow diagram of server-perspective SMS portal operations in accordance with an example.

FIGS. 3A & 3B illustrate flow diagrams from a client-perspective and server-perspective, respectively, of SMS portal-based parts reservation operations in accordance with an example. For example, an SMS portal 130 configured on a client device 120 may be configured to perform one or more of the steps of FIG. 3A, while SMS 110 may be configured to perform one or more of the steps of FIG. 3B. In some examples, as illustrated in FIGS. 4-9, client device 120 and/or SMS 110 may be further configured to generate and/or transmit to at least one of the plurality of client devices a first display element comprising the contingent reservation of the part by the user, a second display element comprising at least one of a planned or real-time quantity of the part in the inventory, a third display element comprising a real-time quantity of the part out on contingent reservation, or a fourth display element comprising a tracking number for a replenishment of the part enroute to the inventory.

In flow diagram 300, a user identifies a need for a part at step 310. For example, a user/field engineer may be employed by, or otherwise affiliated with, a merchant entity to respond to a field service repair case, e.g., to repair an operational telecommunication system. In accordance with the examples herein, the merchant entity may issue to the user/field engineer a client device comprising an SMS portal, e.g., client device 120 comprising SMS portal 130 as described above. In response to a field service repair case (e.g., a repair ticket relating to a service interruption), the user/field engineer may identify that a replacement part may be required to resolve the issue. In such an instance, client device 120 may be configured to allow the user/field engineer to access SMS portal 130 to initiate a part reservation process based on the identified need. SMS portal 130 may be configured to display a "Home Page" graphical user interface (GUI) to the user, as shown in FIG. 4.

Figure 4:
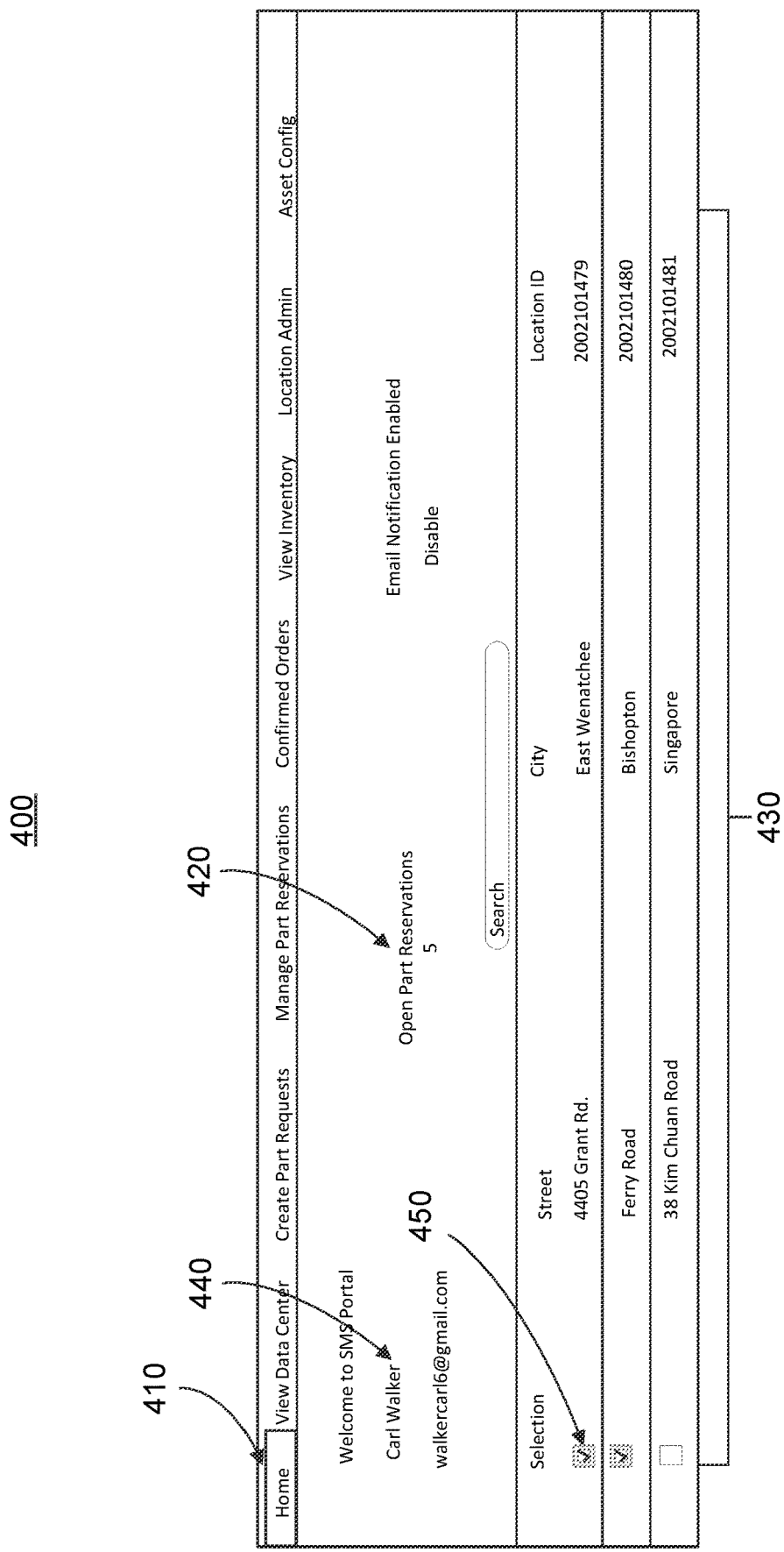
FIG. 4 illustrates a graphical representation of an SMS portal "Home Page" tab display of inventory locations in accordance with an example.

FIG. 4 illustrates a graphical representation of an SMS portal "Home Page" tab display of inventory locations in accordance with an example. In display 400, "Home Page" tab 410 allows access to an SMS portal in which current open part reservations 420 and available inventory locations 430 are displayed for a user 440. For example, the available inventory locations may be displayed based on a user access level for identified locations (e.g., based on a location ID), a geographical location (e.g., street, city, etc.), or other criteria. Tab 410 may be further configured to allow a user to select at least one inventory location for parts reservations. For example, when the user identifies a need for a part, the user may select at least one inventory location for available parts, such as by selecting indicator button 450 for an inventory location.

Figure 5:
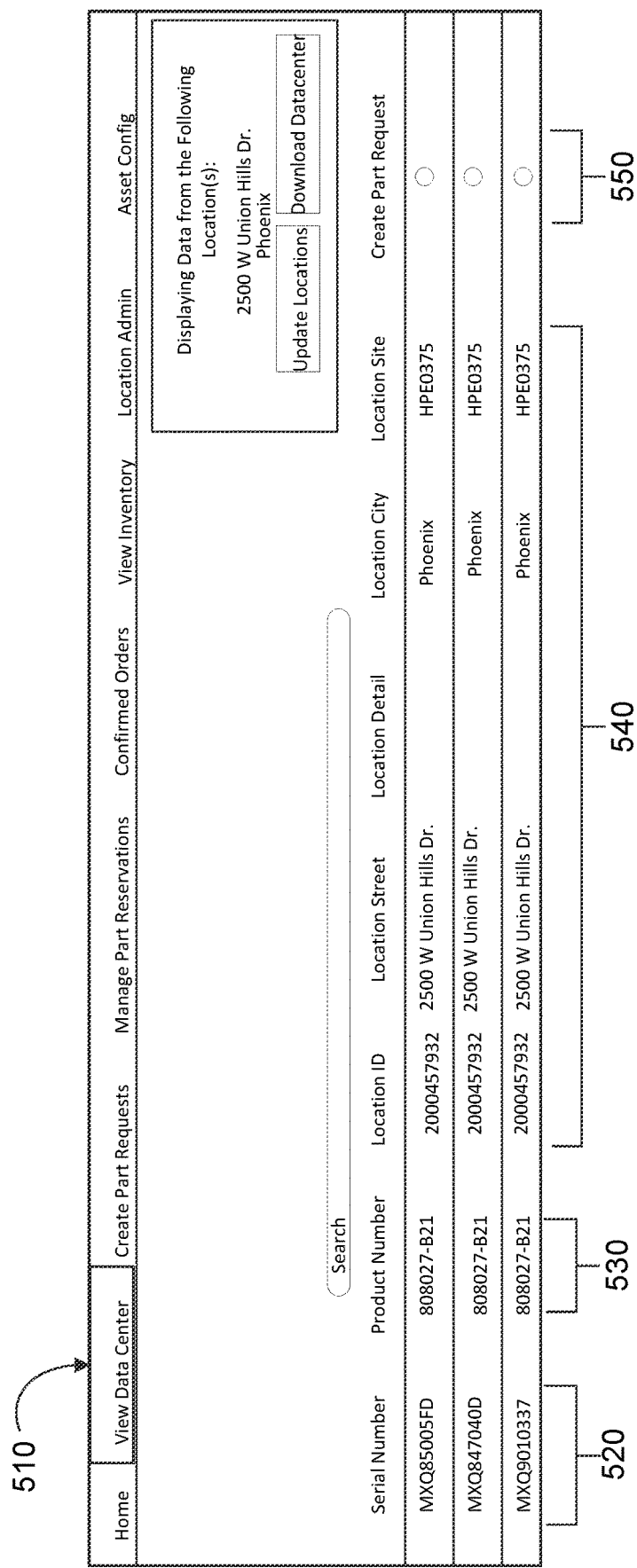
FIG. 5 illustrates a graphical representation of an SMS portal "View Data Center" tab display of available parts corresponding to an inventory location in accordance with an example.

FIG. 5 illustrates a graphical representation of an SMS portal "View Data Center" tab display of available parts corresponding to an inventory location in accordance with an example. In display 500, upon selection of at least one inventory location via "Home Page" tab 410, "View Data Center" tab 510 displays available parts at the selected inventory location(s). Display 500 may include various data, e.g., serial number 520, product number 530, and location data 540 (e.g., location ID, street, city, site name, etc.) related to available parts. Further, "View Data Center" tab 510 may be configured to allow a user to initiate a part request via selector buttons 550 associated with individual parts.

Figure 6:
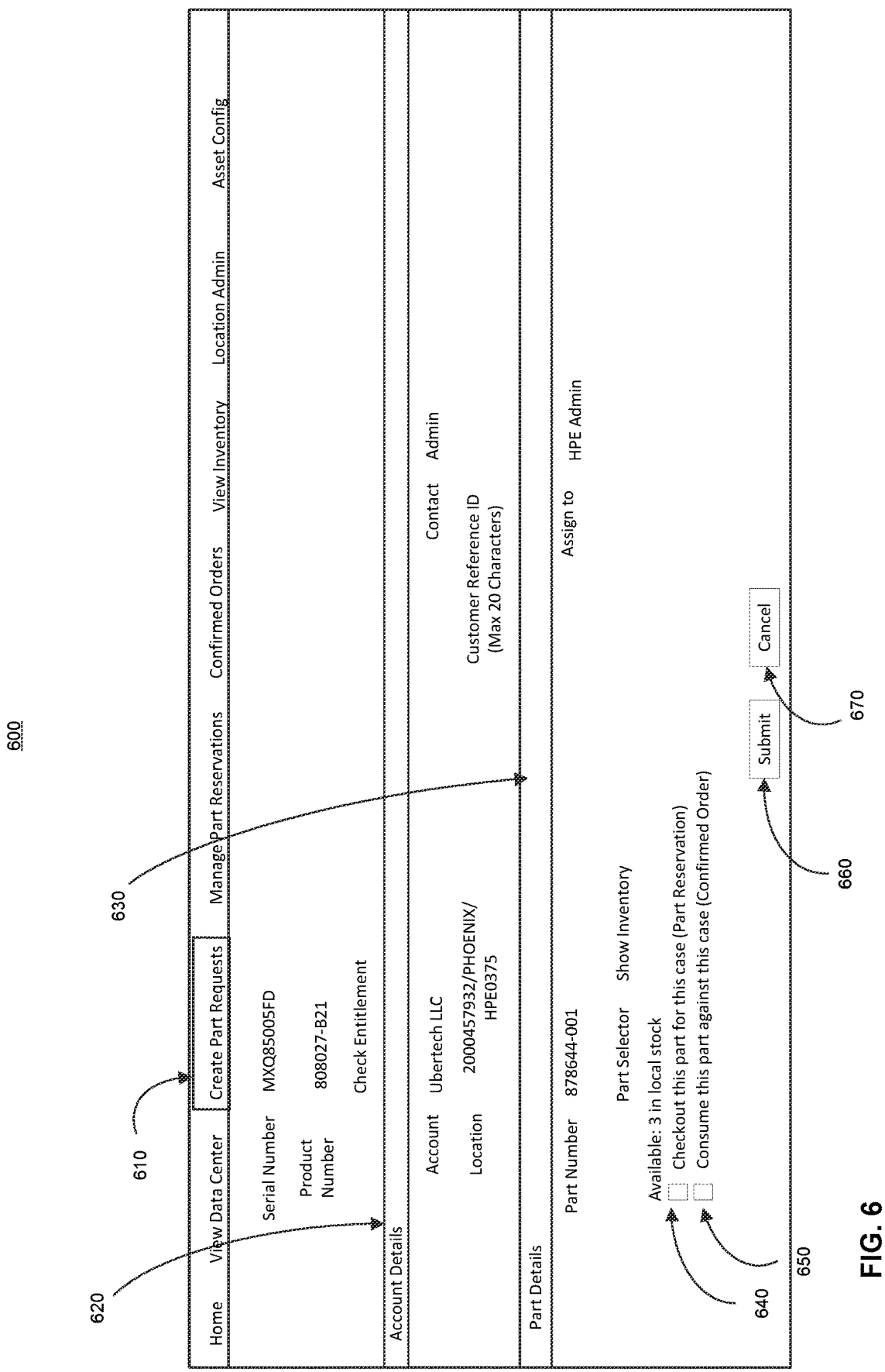
FIG. 6 illustrates a graphical representation of an SMS portal "Create Part Requests" tab display of a contingent part request in accordance with an example.

FIG. 6 illustrates a graphical representation of an SMS portal "Create Part Requests" tab display of a contingent part request in accordance with an example. In display 600, upon user selection of a part for reservation via a selector button 550, "Create Parts Requests" tab 610 displays a parts reservation form. For example, the parts reservation form for a selected part may comprise various account details 620 (e.g., account name/contact, location, customer reference ID, etc.) and part details 630 (e.g., part number, organizational assignment, etc.). Further, tab 610 may be configured to allow for a user selection of a contingent reservation 640 of the part for a repair case, and for a user selection of a confirmed reservation 650 indicating that the part has been consumed for the repair case. For example, once a contingent reservation selection is made, tab 610 further allows the user to submit 660 (or cancel 670) the part reservation order.

Referring back to FIG. 3A, upon user selection and submission of a contingent reservation, SMS portal 130 generates and transmits a contingent reservation request for the part to SMS 110 at step 320. If the part is immediately available, SMS portal 130 further assigns the part at step 330. For example, SMS portal 130, via SMS 110, may access an inventory database indicating that the part is in stock at a physical inventory location proximate to the user/field engineer's location. Based on the indicated availability and reservation request, SMS portal 130 may generate or update an entry in the inventory database to reflect that the part has been assigned to (reserved for use by) the user/field engineer.

From the server-side perspective 340 shown in FIG. 3B, upon receiving the contingent reservation request for the part, SMS 110 generates and transmits a contingent reservation update to at least one of a plurality of client devices, e.g., at least one of client devices 120A-E, at step 345. For example, SMS 110 may generate a contingent reservation update upon receiving the contingent reservation request from the user/field engineer's client device. Then, in real time, SMS 110 may transmit the contingent reservation update to client devices associated with other users. For example, the contingent reservation update for the part may be displayed in the SMS portal of at least one client device associated with another user.

Figure 7:
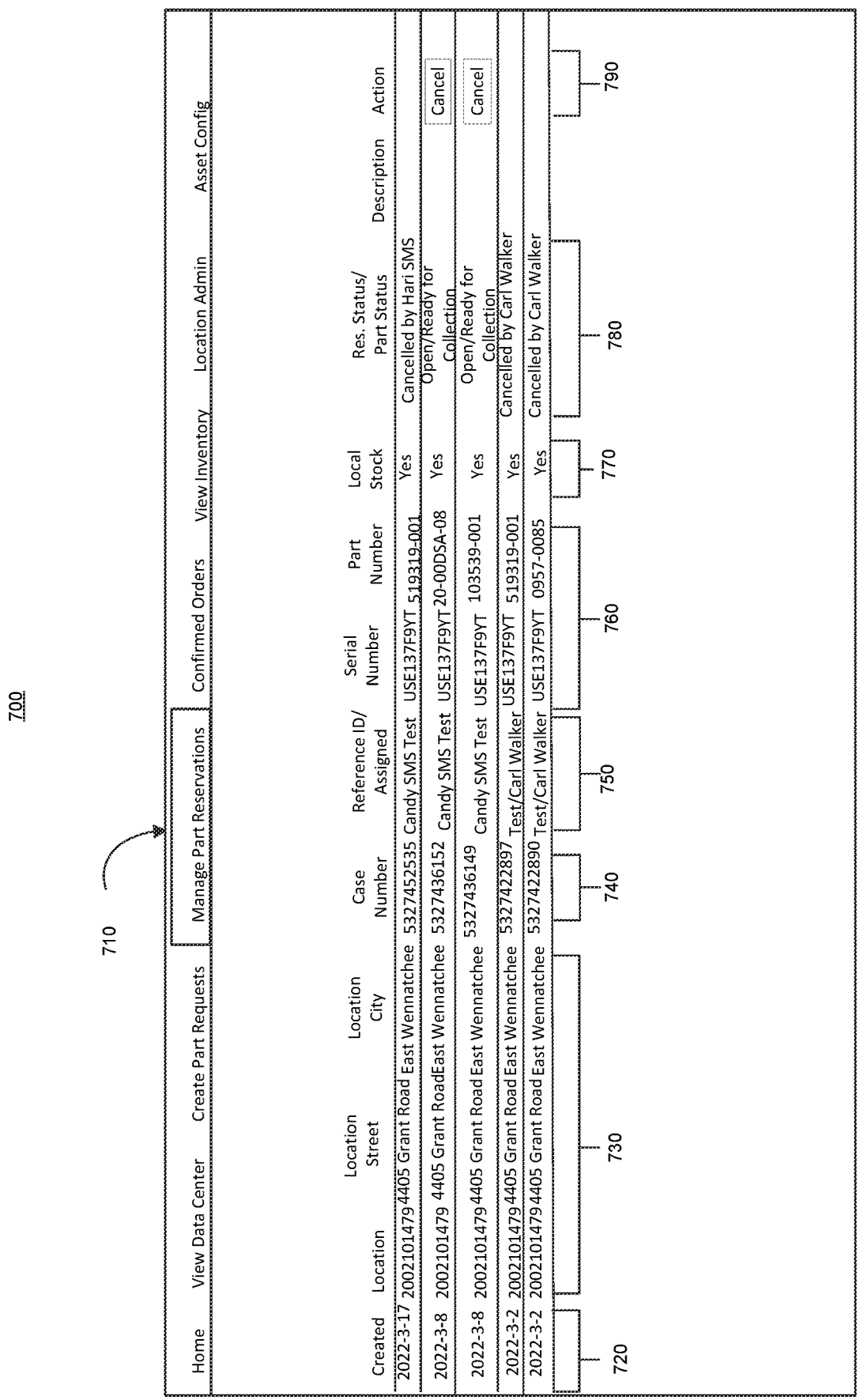
FIG. 7 illustrates a graphical representation of an SMS portal "Manage Part Reservation" tab display of part reservations in accordance with an example.

FIG. 7 illustrates a graphical representation of an SMS portal "Manage Part Reservation" tab display 700 of part reservations in accordance with an example. Tab 710 displays a summary of part reservation data, including, e.g., a creation date 720, inventory location data 730, an assigned case number 740, a customer (merchant entity) reference ID number/assigned user 750, part identification data 760, real-time local stock data 770, and real-time reservation/part status data 780. For example, the real-time reservation/part status data 780 may indicate that a part reservation has been cancelled (and by whom), that a reservation is open (current) with the selected part ready for collection, or other descriptive information. Further, tab 710 may also allow the user to cancel 790 an open part reservation order.

Referring back to FIG. 3A, the user may scan the selected part out of the inventory to complete the repair case at step 350. For example, a client device 120 may further comprise a camera and/or bar code scanner configured to scan and read (e.g., from a box or label for the part) at least one of a stock-keeping unit (SKU), a quick response (QR) code, a serial number, or a product number associated with the part. The scanned or read information may then be recorded via SMS portal 130, e.g., locally at the client device or remotely via a transmission to SMS 110. After scanning the part out of inventory, the user may physically remove the part from inventory to complete the repair case.

Figure 8:
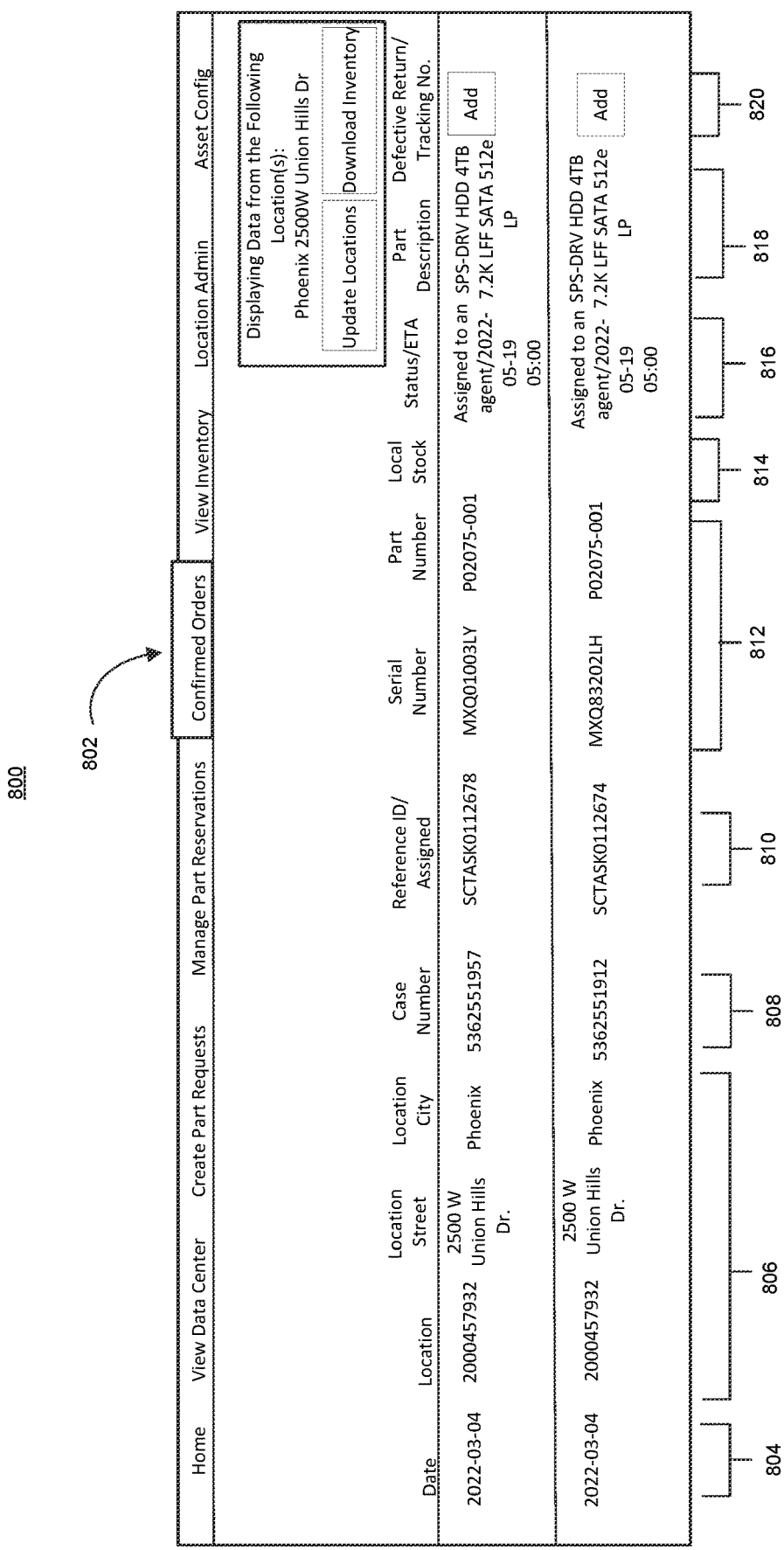
FIG. 8 illustrates a graphical representation of an SMS portal "Confirmed Orders" tab display of confirmed part reservations in accordance with an example.

FIG. 8 illustrates a graphical representation of an SMS portal "Confirmed Orders" tab display 800 of confirmed part reservations in accordance with an example. Tab 802 displays information related to confirmed part reservations including, e.g., reservation date 804, inventory location 806, a case number 808, customer (merchant entity) reference ID number/assigned user 810, part identification data 812, real-time local stock data 814, and real-time reservation/part status data 816, and a part description 818.

From the client-side perspective of FIG. 3A, if the part is not used in the repair case at decision 360, the user may scan the part back into the inventory at step 370. For example, after physically removing the part from inventory and beginning the repair job, the user may find that the currently in-use part is not damaged or defective, or that the root cause of the issue is not the currently in-use part. In such case, the user may determine that the part removed from inventory is not needed and can be replaced in inventory for future reservation by other users.

Once the part is scanned back into the inventory, SMS portal 130 may generate and transmit a contingent reservation update to SMS 110 indicating that the part is open for reservation. In some examples, SMS 110 may generate and transmit the contingent reservation update to at least one of a plurality of client devices, e.g., at least one of client devices 120A-E.

Referring back to FIG. 8, tab 802 may allow the user to add defective return/return tracking information 820. For example, upon scanning the part back into inventory, the user may further indicate that the reserved part not used in the repair case is defective and being returned, e.g., to a part manufacturer or supplier.

Referring back to the server-side perspective 380 of FIG. 3B, if the part is used in the repair case at decision 360, SMS 110 generates and transmits a contingent reservation confirmation to at least one of a plurality of client devices, e.g., at least one of client devices 120A-E, at step 385. For example, after physically removing the part from inventory and beginning the repair job, the user may find that the currently in-use part is damaged or defective. In such case, the user may complete the repair by replacing the currently in-use part with the reserved part.

Upon confirmation that the part has been consumed, the contingent reservation confirmation for the part may be displayed in the SMS portal of the at least one client device. Further, SMS 110 may update the repair case details and/or facilitate reconciliation of a transaction associated with the part, e.g., via ERP system 140, at step 390.

Figure 9:
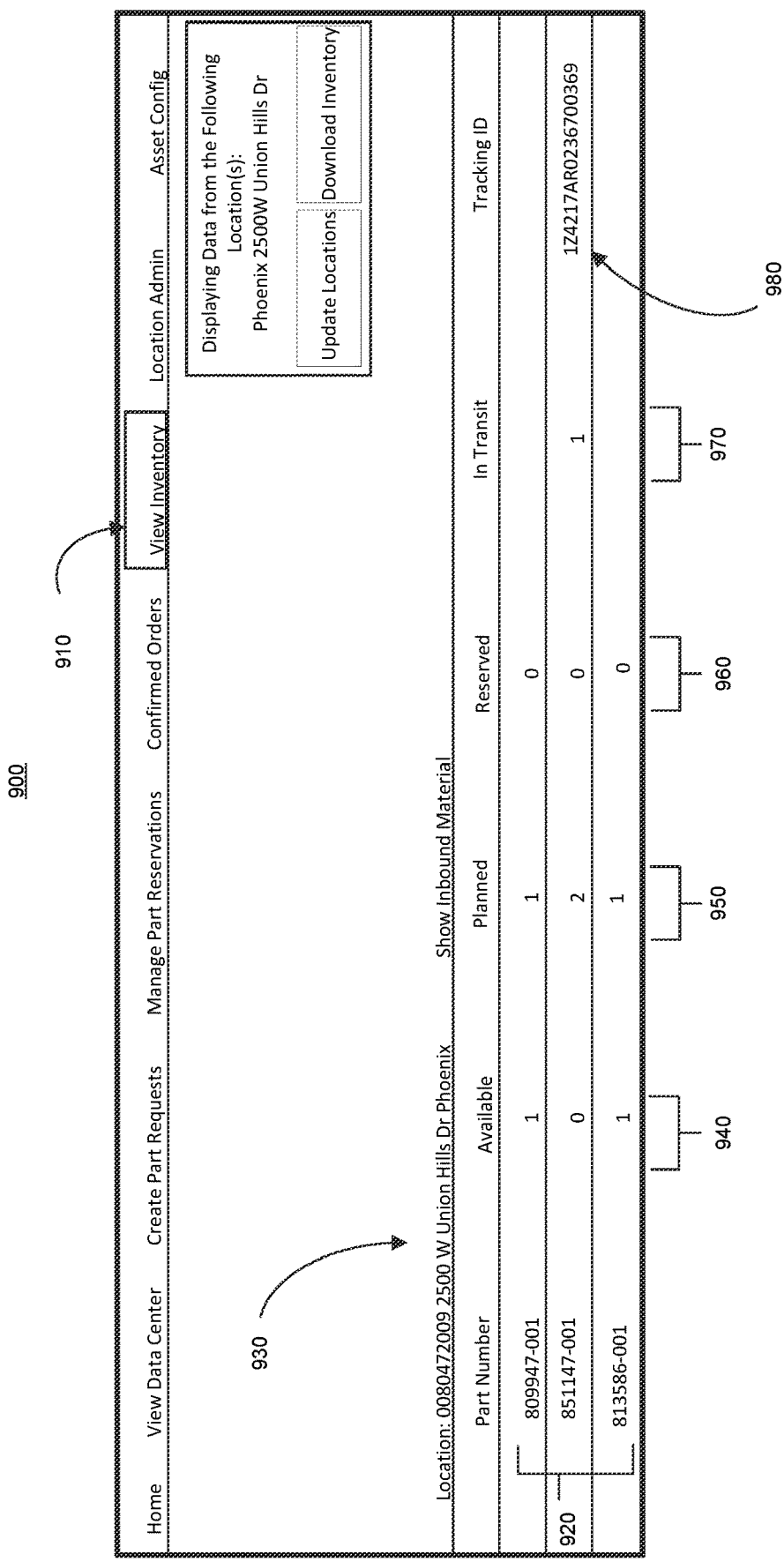
FIG. 9 illustrates a graphical representation of an SMS portal "View Inventory" tab display of part inventory stock conditions in accordance with an example.

FIG. 9 illustrates a graphical representation of an SMS portal "View Inventory" tab display 900 of part inventory stock conditions in accordance with an example. Tab 910 displays inventory status information for selected parts 920 at an inventory location 930 including, e.g., a number of available parts at the inventory location 940, planned shipments 950, reservation status of selected parts 960, a number of parts in transit 970, and tracking ID(s) for parts in transit 980. For example, once a part is consumed, a user may access tab 910 to check the real-time status and availability of selected inbound parts at a selected inventory location based on, e.g., real-time updates received from SMS 110.

Figure 10:
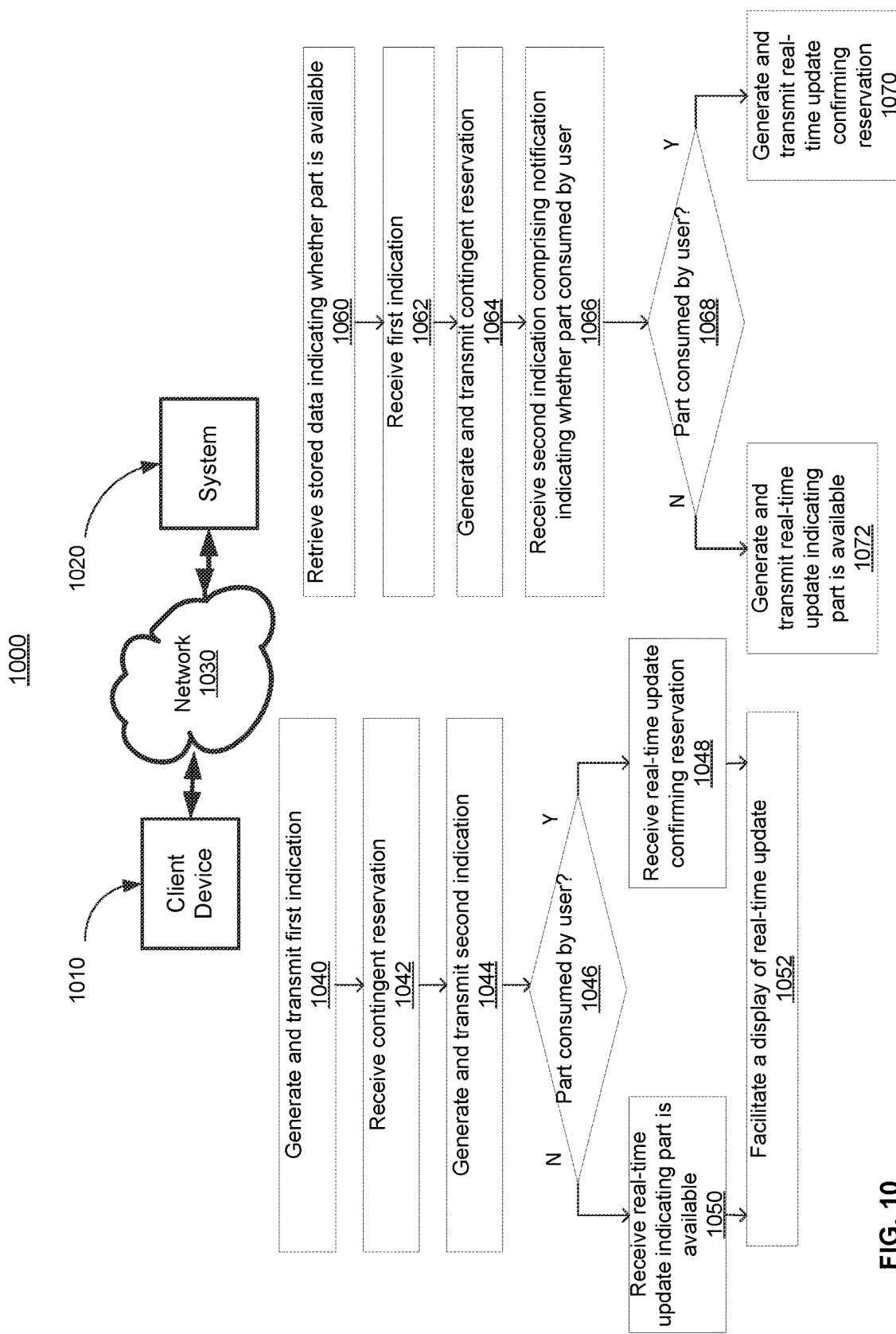
FIG. 10 illustrates a block diagram of an exemplary client-server relationship that can be used for implementing one or more aspects of the various examples.

A high-level block diagram of an exemplary client-server relationship that may be used to implement systems, apparatus and methods described herein is illustrated in FIG. 10. Client-server relationship 1000 comprises client device 1010 in communication with server 1020 via network 1030 and illustrates one possible division of the method steps of FIGS. 2A, 2B, 3A and 3B between client device 1010 and server 1020.

For example, client device 1010, in accordance with the various examples described above, may generate and transmit a first indication comprising a request from a user to reserve a part in an inventory at step 1040. For example, a user may initiate a reserve request for a part in the inventory by using client device 1010 to scan and transmit a QR code affixed to the part (or affixed to packaging related to the part). In response to data indicating that the part is available to the user, client device 1010 may further receive a contingent reservation of the part by the user at step 1042. For example, client device 1010 may receive a contingent reservation of the part generated and transmitted by server 1020. Client device 1010 may further generate and transmit a second indication comprising a notification indicating whether the part has been consumed by the user at step 1044. For example, the user may use client device 1010 to scan a QR code affixed to the part (or affixed to packaging related to the part) and transmit to server 1020 the second indication comprising the QR code and a notification indicating whether the part has been consumed.

In response to a notification indicating that the part has been consumed by the user at step 1046, client device 1010 may further receive from server 1020 a real-time update to the contingent reservation comprising a confirmed reservation of the part by the user at step 1048. The confirmed reservation may inform the user of client device 1010 and different users associated with other client devices that the part has been consumed and is no longer available for reservation.

In response to a notification indicating that the part has not been consumed by the user at step 1046, client device 1010 may further receive from server 1020 a real-time update to the contingent reservation comprising an indication that the part is available for reservation at step 1050. Client device 1010 may facilitate a display of the real-time update to the contingent reservation at step 1052.

Based on a received request from a first client device (e.g., client device 1010), server 1020 may retrieve from at least one inventory database stored data indicating whether a part is available to a user, where the first client device is one of a plurality of client devices having access to reserve parts in an inventory at step 1060. For example, the stored data indicating that the part is available to the user may comprise data indicating that the part is available at an at least one inventory location associated with the user. In the alternative, if the part is not available at an inventory location local to the user, server 1020 may generate and transmit to the user (via the first client device) an offer to initiate a confirmation order from a remote warehouse location.

Server 1020 may further receive from the first client device (e.g., client device 1010) a first indication comprising a request from the user to reserve the part in the inventory at step 1062. In some examples, the first indication may comprise a user selection of at least one inventory location associated with the user and/or the part. In response to data indicating that the part is available to the user, server 1020 may further generate and transmit to at least one of the plurality of client devices a contingent reservation of the part by the user at step 1064. For example, server 1020 may generate a contingent reservation upon receiving a contingent reservation request from the first client device, e.g., client device 1010. Then, in real time, server 1020 may transmit the contingent reservation to other client devices. Server 1020 may further receive from the first client device a second indication comprising a notification indicating whether the part has been consumed by the user at step 1066.

In response to the notification indicating that the part has been consumed by the user at step 1068, server 1020 may further generate and transmit to at least one of the plurality of client devices a real-time update to the contingent reservation comprising a confirmed reservation of the part by the user at step 1070. For example, the confirmed reservation may inform the user of the first client device (client device 1010) and different users associated with other client devices that the part has been consumed and is no longer available for reservation.

In response to the notification indicating that the part has not been consumed by the user at step 1068, server 1020 may further generate and transmit to at least one of the plurality of client devices a real-time update to the contingent reservation comprising an indication that the part is available for reservation at step 1072. For example, the user who reserved the part may facilitate replacement of the part in the inventory by scanning the part back into the inventory. In some examples, in response to the notification indicating that the part has not been consumed by the user, server 1020 may facilitate replacement of the part in the inventory without initiating a return merchandise authorization (RMA) process.

One skilled in the art will appreciate that the exemplary client-server relationship illustrated in FIG. 10 is only one of many client-server relationships that are possible for implementing the systems, apparatus, and methods described herein. As such, the client-server relationship illustrated in FIG. 10 should not, in any way, be construed as limiting. Examples of client devices 1010 can include cellular smartphones, kiosks, personal data assistants, tablets, laptop computers, desktop computers, robots, vehicles, web cameras, or other types of computing devices.

Systems, apparatus, and methods described herein may be implemented using a computer program product tangibly embodied in an information carrier, e.g., in a non-transitory machine-readable storage device, for execution by a programmable processor; and the method steps described herein, including one or more of the method steps herein, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 11:
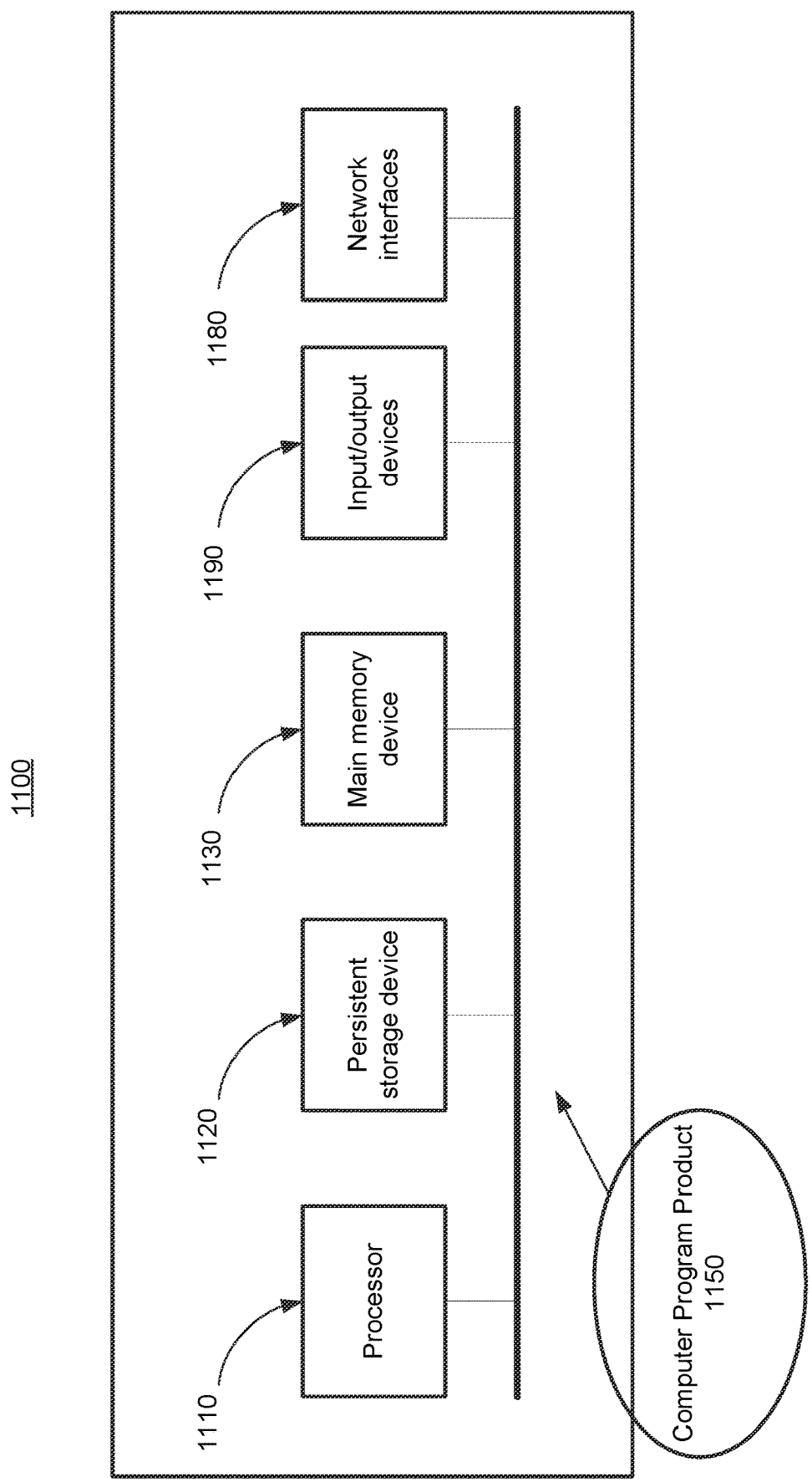
FIG. 11 illustrates a block diagram of a distributed computer system that can be used for implementing one or more aspects of the various examples.

A high-level block diagram of an exemplary apparatus that may be used to implement systems, apparatus and methods described herein is illustrated in FIG. 11. Apparatus 1100 comprises a processor 1110 operatively coupled to a persistent storage device 1120 and a main memory device 1130. Processor 1110 controls the overall operation of apparatus 1100 by executing computer program instructions that define such operations. The computer program instructions may be stored in persistent storage device 1120, or other computer-readable medium, and loaded into main memory device 1130 when execution of the computer program instructions is desired. For example, SMS 110, the plurality of client devices 120, ERP system 140, and inventory management system 150 may comprise one or more components of computer 1100. Thus, the various method steps herein can be defined by the computer program instructions stored in main memory device 1130 and/or persistent storage device 1120 and controlled by processor 1110 executing the computer program instructions. For example, the computer program instructions can be implemented as computer executable code programmed by one skilled in the art to perform an algorithm defined by the method steps herein. Accordingly, by executing the computer program instructions, the processor 1110 executes an algorithm defined by the method steps herein. Additionally, or alternatively, instructions for implementing the method steps herein in accordance with disclosed examples may reside in computer program product 1150. When processor 1110 is executing the instructions of computer program product 1150, the instructions, or a portion thereof, are typically loaded into main memory device 1130 from which the instructions are readily accessed by processor 1110.

Apparatus 1100 also includes one or more network interfaces 1180 for communicating with other devices via a network. Apparatus 1100 may also include one or more input/output devices 1190 that enable user interaction with apparatus 1100 (e.g., a display, a keyboard, a mouse, speakers, buttons, etc.).

Processor 1110 may include both general and special purpose microprocessors and may be the sole processor or one of multiple processors of apparatus 1100. Processor 1110 may comprise one or more central processing units (CPUs), and one or more graphics processing units (GPUs), which, for example, may work separately from and/or multi-task with one or more CPUs to accelerate processing, e.g., for various image processing applications described herein. Processor 1110, persistent storage device 1120, and/or main memory device 1130 may include, be supplemented by, or incorporated in, one or more application-specific integrated circuits (ASICs) and/or one or more field programmable gate arrays (FPGAs).

Persistent storage device 1120 and main memory device 1130 each comprise a tangible non-transitory computer readable storage medium. Persistent storage device 1120, and main memory device 1130, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 1190 may include peripherals, such as a printer, scanner, display screen, etc. For example, input/output devices 1190 may include a display device such as a cathode ray tube (CRT), plasma or liquid crystal display (LCD) monitor for displaying information (e.g., a DNA accessibility prediction result) to a user, a keyboard, and a pointing device such as a mouse or a trackball by which the user can provide input to apparatus 1100.

Any or all of the systems and apparatuses discussed herein, including SMS 110, the plurality of client devices 120, ERP system 140, and inventory management system 150 may be performed by, and/or incorporated in, an apparatus such as apparatus 1100. Further, apparatus 1100 may utilize one or more neural networks or other deep-learning techniques to perform SMS 110, the plurality of client devices 120, ERP system 140, inventory management system 150, or other systems or apparatuses discussed herein.

One skilled in the art will recognize that an implementation of an actual computer or computer system may have other structures and may contain other components as well (e.g., batteries, fans, motherboards, power supplies, etc.), and that FIG. 11 is a high-level representation of some of the components of such a computer for illustrative purposes.

The various examples are described herein with reference to the accompanying drawings, which form a part hereof, and which show, by way of illustration, specific ways of practicing the examples. This specification may, however, be embodied in many different forms and should not be construed as being limited to the examples set forth herein; rather, these examples are provided so that this specification will be thorough and complete, and will fully convey the scope of the examples to those skilled in the art. Among other things, this specification may be embodied as methods or devices. Accordingly, any of the various examples herein may take the form of an entirely hardware example, an entirely software example or an example combining software and hardware aspects. The specification is, therefore, not to be taken in a limiting sense.

Throughout the specification and claims, the following terms take the meanings explicitly associated herein, unless the context clearly dictates otherwise:

The phrase "in an example" as used herein does not necessarily refer to the same example, though it may. Thus, as described above, various examples may be readily combined, without departing from the scope or spirit thereof.

As used herein, the term "or" is an inclusive "or" operator and is equivalent to the term "and/or," unless the context clearly dictates otherwise.

The term "based on" is not exclusive and allows for being based on additional factors not described, unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of a networked environment where two or more components or devices are able to exchange data, the terms "coupled to" and "coupled with" are also used to mean "communicatively coupled with", possibly via one or more intermediary devices.

In addition, throughout the specification, the meaning of "a", "an", and "the" includes plural references, and the meaning of "in" includes "in" and "on".

Although some of the various examples presented herein constitute a single combination of inventive elements, it should be appreciated that the inventive subject matter is considered to include all possible combinations of the disclosed elements. As such, if one example comprises elements A, B, and C, and another example comprises elements B and D, then the inventive subject matter is also considered to include other remaining combinations of A, B, C, or D, even if not explicitly discussed herein. Further, the transitional term "comprising" means to have as parts or members, or to be those parts or members. As used herein, the transitional term "comprising" is inclusive or open-ended and does not exclude additional, unrecited elements or method steps.

Throughout the above discussion, numerous references have been made regarding servers, services, interfaces, clients, peers, portals, platforms, or other systems formed from computing devices. It should be appreciated that the use of such terms is deemed to represent one or more computing devices having at least one processor (e.g., ASIC, FPGA, DSP, x86, ARM, ColdFire, GPU, multi-core processors, etc.) configured to execute software instructions stored on a computer readable tangible, non-transitory medium (e.g., hard drive, solid state drive, RAM, flash, ROM, etc.). For example, a server can include one or more computers operating as a web server, database server, or other type of computer server in a manner to fulfill described roles, responsibilities, or functions. One should further appreciate the disclosed computer-based algorithms, processes, methods, or other types of instruction sets can be embodied as a computer program product comprising a non-transitory, tangible computer readable medium storing the instructions that cause a processor to execute the disclosed steps. The various servers, systems, databases, or interfaces can exchange data using standardized protocols or algorithms, possibly based on HTTP, HTTPS, AES, public-private key exchanges, web service APIs, known financial transaction protocols, or other electronic information exchanging methods. Data exchanges can be conducted over a packet-switched network, a circuit-switched network, the Internet, LAN, WAN, VPN, or other type of network.

As used in the description herein and throughout the claims that follow, when a system, server, device, or other computing element is described as being configured to perform or execute functions on data in a memory, the meaning of "configured to" or "programmed to" is defined as one or more processors or cores of the computing element being programmed by a set of software instructions stored in the memory of the computing element to execute the set of functions on target data or data objects stored in the memory.

It should be noted that any language directed to a computer should be read to include any suitable combination of computing devices, including servers, interfaces, systems, databases, agents, peers, controllers, or other types of computing devices operating individually or collectively. One should appreciate the computing devices comprise a processor configured to execute software instructions stored on a tangible, non-transitory computer readable storage medium (e.g., hard drive, FPGA, PLA, solid state drive, RAM, flash, ROM, etc.), and may comprise various other components such as batteries, fans, motherboards, power supplies, etc. The software instructions configure or program the computing device to provide the roles, responsibilities, or other functionality as discussed below with respect to the disclosed apparatus. Further, the disclosed technologies can be embodied as a computer program product that includes a non-transitory computer readable medium storing the software instructions that causes a processor to execute the disclosed steps associated with implementations of computer-based algorithms, processes, methods, or other instructions. In some examples, the various servers, systems, databases, or interfaces exchange data using standardized protocols or algorithms, possibly based on HTTP, HTTPS, AES, public-private key exchanges, web service APIs, or other electronic information exchanging methods. Data exchanges among devices can be conducted over a packet-switched network, the Internet, LAN, WAN, VPN, or other type of packet switched network; a circuit switched network; cell switched network; or other type of network.

The foregoing specification is to be understood as being in every respect illustrative and exemplary, but not restrictive, and the scope of the examples disclosed herein is not to be determined from the specification, but rather from the claims as interpreted according to the full breadth permitted by the patent laws. It is to be understood that the examples shown and described herein are only illustrative of the principles of the present disclosure and that various modifications may be implemented by those skilled in the art without departing from the scope and spirit of the disclosure. Those skilled in the art could implement various other feature combinations without departing from the scope and spirit of the disclosure.

The invention claimed is:

1. A system comprising:
at least one memory having computer-readable instructions stored thereon which, when executed by at least one processor coupled to the at least one memory, cause the at least one processor to:
retrieve, from at least one inventory database, a status availability of a part in an inventory;
determine that a user associated with a first client device is one of a plurality of client devices having access to reserve parts in the inventory;
receive, from the first client device, a request to reserve the part in the inventory;
in response to the status availability of the part indicating that the part is available to the user and determining that the user associated with the first client device has access to reserve parts in the inventory, generate a contingent reservation of the part;
transmit the contingent reservation to at least one of the plurality of client devices;
in response to determining that the part has been consumed by the user, generate a confirmed reservation of the part identifying a real-time update to the contingent reservation of the part and transmit the confirmed reservation to at least one of the plurality of client devices; and
in response to determining that the part has not been consumed by the user within a time threshold of generating the contingent reservation of the part, generate an indication that the part is available for reservation.

2. The system of claim 1, upon determining that the part has been consumed by the user, the at least one processor is further caused to:
facilitate replenishment of the part in the inventory; and
reconcile a transaction associated with the replenishment.

3. The system of claim 1, upon determining that the part has not been consumed by the user within the time threshold of generating the contingent reservation of the part by:
receiving a scan of the part from the first client device;
updating the inventory to identify availability for reservation of the part; and
transmitting the indication that the part is available for reservation.

4. The system of claim 2, wherein facilitating replenishment of the part in the inventory adds the part at an inventory location associated with the user.

5. The system of claim 1, wherein the request associates a geographical location of the user with at least one location of the part in the inventory.

6. The system of claim 1, wherein the at least one processor is further caused to generate at least one of the following:
a first display element comprising the contingent reservation of the part by the user;
a second display element comprising at least one of a planned or real-time quantity of the part in the inventory;
a third display element comprising a real-time quantity of the part associated with the contingent reservation; or
a fourth display element comprising a tracking number for a replenishment of the part to the inventory.

7. The system of claim 1, wherein the request comprises at least one of the following: a Short Message Service message, a stock-keeping unit (SKU), a quick response (QR) code, a serial number, or a product number associated with the part.

8. A computerized method comprising:
retrieving, from at least one inventory database, a status availability of a part in an inventory;
determining that a user associated with a first client device is one of a plurality of client devices having access to reserve parts in the inventory;
receiving, from the first client device, a request to reserve the part in the inventory;
in response to the status availability of the part indicating that the part is available to the user and determining that the user associated with the first client device has access to reserve parts in the inventory, generating a contingent reservation of the part;

transmitting the contingent reservation to at least one of the plurality of client devices;

in response to determining that the part has been consumed by the user, generating a confirmed reservation of the part identifying a real-time update to the contingent reservation of the part and transmitting the confirmed reservation to at least one of the plurality of client devices; and in response to determining that the part has not been consumed by the user within a time threshold of generating the contingent reservation of the part, generating an indication that the part is available for reservation.

9. The method of claim 8, further comprising:

facilitating replenishment of the part in the inventory; and reconciling a transaction associated with the replenishment.

10. The method of claim 9, wherein facilitating replenishment of the part in the inventory adds the part at an inventory location associated with the user.

11. The method of claim 8, wherein the request associates a geographical location of the user with at least one location of the part in the inventory.

12. The method of claim 8, further comprising:

generating a display element comprising at least one of: the contingent reservation of the part by the user, a planned or real-time quantity of the part in the inventory, a real-time quantity of the part associated with the contingent reservation, or a replenishment of the part enroute to the inventory.

13. The method of claim 8, wherein the request comprises at least one of the following: a Short Message Service message, a stock-keeping unit (SKU), a quick response (QR) code, a serial number, and a product number associated with the part.

14. A computer program product having computer-readable instructions stored thereon, which, when executed by at least one processor, cause the at least one processor to perform one or more steps comprising:

retrieving, from at least one inventory database, a status availability of a part in an inventory;

determine that a user associated with a first client device is one of a plurality of client devices having access to reserve parts in the inventory;

receiving, from the first client device, a request to reserve the part in the inventory;

in response to the status availability of the part indicating that the part is available to the user and determining that the user associated with the first client device has access to reserve parts in the inventory, generating a contingent reservation of the part;

transmitting the contingent reservation to at least one of the plurality of client;

in response to determining that the part has been consumed by the user, generating a confirmed reservation of the part identifying a real-time update to the contingent reservation of the part and transmitting the confirmed reservation to at least one of the plurality of client; and in response to determining that the part has not been consumed by the user within a time threshold of generating the contingent reservation of the part, generating an indication that the part is available for reservation.

15. The system of claim 1, wherein the system determines that the user has access to reserve parts in the inventory based on one or more of an affiliation of the user with an inventory location, a clearance level, and a valid warranty.

16. The system of claim 1, wherein the user associated with the first client device having access to reserve parts in the inventory is a field technician.

17. The system of claim 1, wherein the contingent reservation is cancelled based on a conclusion time of a repair job absent manually reentering the part in the inventory.

18. The system of claim 1, wherein the at least one processor is further to:

in response to the real-time update to the contingent reservation and the generation of the confirmed reservation, automatically create an invoice to bill a merchant entity for usage of the part.

19. The system of claim 1, wherein the at least one processor is further to:

upon generating the contingent reservation of the part, adding warranty information indicating that the part is under warranty.

* * * * *